United States Patent [19]

Auerbach et al.

[11] Patent Number: 4,794,516

[45] Date of Patent: Dec. 27, 1988

[54] METHOD AND APPARATUS FOR COMMUNICATING DATA BETWEEN A HOST AND A PLURALITY OF PARALLEL PROCESSORS

[75] Inventors: Daniel J. Auerbach; Tien C. Chen; Wolfgang J. Paul, all of San Jose, Calif.

[73] Assignee: International Business Machines Corporation, Armonk, N.Y.

[21] Appl. No.: 794,354

[22] Filed: Oct. 31, 1985

[51] Int. Cl.⁴ ............................................. G06F 13/14
[52] U.S. Cl. ..................................................... 364/200
[58] Field of Search ... 364/200 MS File, 900 MS File; 340/825.5, 825.51; 370/89, 90, 95

[56] References Cited

U.S. PATENT DOCUMENTS

| | | | |
|---|---|---|---|
| 3,925,766 | 12/1975 | Bardoffi et al. | 364/200 |
| 4,458,314 | 7/1984 | Grimes | 364/200 |
| 4,463,445 | 7/1984 | Grimes | 364/900 |
| 4,470,110 | 9/1984 | Chiarottino et al. | 364/200 |
| 4,609,995 | 9/1986 | Hasebe | 364/900 |

OTHER PUBLICATIONS

"Persistent and Nonpersistent CSMA", Tanenbaum, Computer Networks, Prentice-Hall Publishing Co., 1981, pp. 289-291.

"Arbitration and Control Acquisition in the Porposed IEEE 896 Future Bus", IEEE Micro, Aug. 1984, pp. 28-41.

Primary Examiner—Gareth D. Shaw
Assistant Examiner—Jonathan C. Fairbanks
Attorney, Agent, or Firm—Mark A. Haynes; David J. Arthur

[57] ABSTRACT

In a centrally controlled resource arbitration system, each of the units concurrently requesting access sends its identity code and the binary complement thereof to a central arbitration processor. The identity codes are logically combined into a first word, and the binary complements are logically combined into a second word. A subset identifier of the requesting units is then formed by combining corresponding bits of the first and second words. Unresolved values in the subset identifier are iteratively removed to eliminate a subset of the requesting units. When all but one of the requesting units have been eliminated, access to the resource is given to the remaining unit.

15 Claims, 5 Drawing Sheets

FIG. 2 ARBITRATION LOGIC

REQUEST LOGIC FOR PROCESSOR U-13 (BINARY ADDRESS 1101)

ced by the central processor in resolving contention# METHOD AND APPARATUS FOR COMMUNICATING DATA BETWEEN A HOST AND A PLURALITY OF PARALLEL PROCESSORS

TECHNICAL FIELD

This invention relates to the communication of data in a multiprocessor system. More particularly, it relates to a method of data communication for enabling a host to arbitrate access to a shared resource in a system having a multiplicity of processors. The method can also be used for enabling the host to detect the processing states of a subset of the processors.

BACKGROUND OF THE INVENTION

In a multiprocessor system where a common resource cannot be used simultaneously by more than one processing unit, access to the resource must be arbitrated among simultaneous requestors.

Arbitration can be achieved by time-division multiplexing whereby each processing unit is allotted a specific time slot during which it can have the exclusive use of the resource. The drawback for this approach, as manifested in a system where processors operate in burst mode, is that time which could otherwise be used by processors needing the resource must also be allotted to idle processors, thus decreasing the utilization of the resource.

In another arbitration method, as described by Tanenbaum, "Computer Networks", Prentice-Hall Publishing Co., 1981, each processor is required to detect the existence of a collision while it is attempting to gain access to the resource. If a collision is detected, the processor must perform a randomization process before a request is retried. Because of the randomization requirement, this method does not guarantee when a processor may gain access to the resource.

Chiarottino et al, U.S. Pat. No. 4,470,110, "System for Distributed Priority Arbitration Among Several Processing Units Competing for Access to a Common Data Channel", issued Sept. 4, 1984, describe an arbitration method whereby each processor is assigned a priority number. During contention time, iterative bit comparisons are made among all the priority numbers forwarded by the requestors. After each bit comparison, a subset of requestors, which have comparatively lower priority numbers at that bit position, is removed until the processor with the highest priority number ultimately gains access to the resource.

Grimes, U.S. Pat. No. 4,463,445, "Circuitry for Allocating Access to a Demand-shared Bus", issued July 31, 1984, describes a similar method in which the priority numbers are modified by parameter bits which reflect some states of the requestors. His method prioritizes requests first by the states and then by the priority numbers of the requestors. A similar method is described in Taub, "Arbitration and Control Acquisition in the Proposed IEEE 896 Future Bus", IEEE MICRO, August 1984, pp. 28–41. These prioritized arbitration methods lack flexibility because selection of a processor to which access is granted is fixed by the assignment of priority numbers.

There is a need for an improved method in which all the requestors are identified in an unbiased manner. Based upon this method, a centralized arbitration system can be implemented in which the selection of a requestor depends purely on an algorithm executed within a host. The advantages of such a system include the following:

1. The host can service a multiplicity of unranked processors with a scheme that can be changed dynamically, depending on the state of the system.
2. The complexity and functional characteristics of the arbitration system can be made to depend on changeable software running within the host.
3. A subset of requestors to whom access to the resource cannot be granted for some operational reasons can be identified and ignored readily by the host.
4. The time and hardware required for processing the arbitration is kept at a minimum.
5. The number of steps required to identify a subset of requestors does not increase exponentially according to the number of processing units needing the resource.

THE INVENTION

One object of this invention is to facilitate the resolution of access conflicts among $N <= 2^{**}m$ requestors in a centralized arbitration system by identifying requestors in an unbiased manner.

Another object is to identify a requestor in no more than $m-1$ interchanges between the host and the requestors.

An additional object is to allow a host to detect the processing states of N processors in a multiprocessor system in no more than $m-1$ interchanges between the host and processors.

SUMMARY OF THE INVENTION

According to the invention, a data communication method is disclosed which can be used to implement an unbiased arbitration system. This method can be used to identify one of $N <= 2^{**}m$ processors requesting access to a shared resource. Each of the processors is designated by a unique m-bit identifier. This method can also be used to enable the host to detect the processing states of said N processors in no more than m interchanges between the host and the processors.

The method, according to the invention, comprises the following steps: A requestor puts its identifier on a common bus. A binary complement of the identifier is also created. The identifiers of all processors are then combined to form a first m-bit word. Similarly, a second m-bit word is formed by logically combining the binary complements of the identifiers. An m-digit subset identifier is then created to designate a subset of requestors, each digit taking a value which, as illustrated, depends on one of four possible logical combinations of a bit from the first word and a bit of like significance from the second word. The maximum size of the subset of requestors is then a function of the number of conflicting bits between said two words and the subset of processors which includes all requestors can be identified as a function of the positions of the conflicting bits. The arbitration process then replaces one conflicting digit, arbitrarily or otherwise, with a value of 0 or 1, thereby eliminating one or more requesting processors from the subset. The above process is iterated until there remains only one requestor, to which access is granted.

DESCRIPTION OF THE PREFERRED EMBODIMENT

Figure 1:
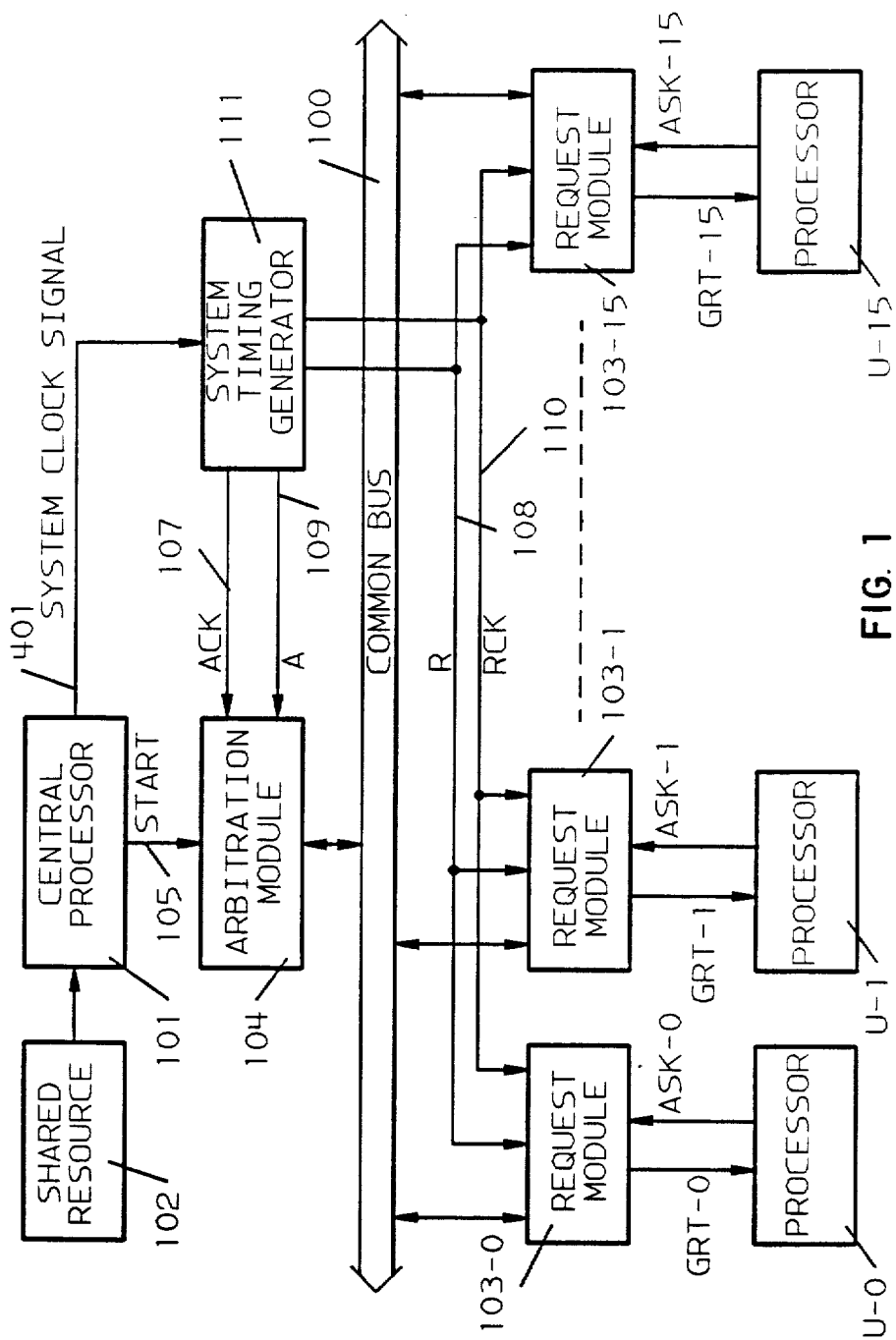
FIG. 1 is a simplified block diagram of the system embodying the present invention.

As illustrated in FIG. 1, the multiprocessor system embodying the invention comprises 16 processors, U-0 to U-15, connected to an 8-bit-wide common bus 100, which in turn is linked to a central processor 101. Each processor U is identified by a unique 4-bit address (i.e. from binary 0000 to 1111). Processors U-0 to U-15 share a common resource 102 (e.g. a data base, a costly I/O device, etc.), the access to which is controlled by central processor 101. Requests for access to common resource 102 are made by request modules 103-0 through 103-15 of processors U-0 through U-15. Access arbitration is performed by an arbitration module 104 of central processor 101. System clock signals 107 through 110 are generated by a system timing generator 111 which comprises conventional digital circuits well known to the art.

Central processor 101 addresses a subset of processors U-0 through U-15 by sending an identifier YY which consists of two 4-bit components, P and Q. For a given processor, the ith bit of P and the ith bit of Q conform to the following rule:

TABLE 1

| P$<i>$ | Q$<i>$ | YY$<i>$ | Meanings |
|---|---|---|---|
| 0 | 0 | [E] | Invalid |
| 0 | 1 | [0] | Processors with an ith address bit of "0" are addressed |
| 1 | 0 | [1] | Processors with an ith address bit of "1" are addressed |
| 1 | 1 | [X] | A "don't care" in the ith address bit position - processors with an ith address bit of either "0" or "1" are addressed |

As an example, central processor 101 can address processor U-3 (binary address 0011) by sending an identifier with P equal to 0011 and Q equal to 1100. According to Table 1, P and Q combine to form a YY identifier of [0011].

For given values of P and Q, the values of YY are defined. Conversely, given the values of YY, the values of P and Q are defined. Moreover, a given value of YY can be used to address a unique subset of processors within the multiprocessor system. As an example, assume that central processor 101 wants to address both U-1 (binary address 0001) and U-3 (binary address 0011) simultaneously. Since the third bits of these two processors' addresses are different, a first word of P equal to 0011 and a second word of Q equal to 1110 would be sent. According to Table 1, P (0011) and Q (1110) combine to form a YY identifier of [00X1] which indicates a "don't care" value in the third identifier bit position.

Access Arbitration

When common resource 102 is available, central processor 101 sends a START signal 105 to arbitration module 104 to start the arbitration process. The START signal is sent by means of an I/O operation performed by central processor 101 on one of its output ports. As will be described later, the START signal causes arbitration module 104 to send an identifier YY with a first word P equal to 1111 and a second word Q equal to 1111. When combined in accordance with Table 1, P (1111) and Q (1111) form a YY identifier of [XXXX]. Since this YY identifier addresses all processors, any processors within the system needing access to resource 102 can submit their requests to the arbitration module 104.

When a processor U-j needs access to resource 102, it sends a signal ASK-j to its request module 103-j. The ASK-j signal is sent by means of an I/O operation performed by processor U-j on one of its output ports. If the ASK-j signal is active while the YY identifier sent by arbitration module 104 includes processor U-j, request module 103-j would put processor U-j's address on bus 100 during a designated response time. For each ith address bit Bj$<i>$ sent to bus 100, request module 103-j also sends Cj$<i>$, which is the binary complement of Bj$<i>$. By the nature of the bus structure, the corresponding bit B$<i>$ received by arbitration module 104 is the ORed result of all the Bj$<i>$ bits simultaneously sent by processors U-0 to U-15. Similarly, the corresponding bit C$<i>$ received by arbitration module 104 is the ORed result of all the Cj$<i>$ bits simultaneously sent by the processors U-0 to U-15. As a result,

| | |
|---|---|
| B$<i>$ =0 | if and only if all the Bj$<i>$'s are 0's; |
| =1 | if and only if there is at least a "1" among the Bj$<i>$'s. |
| C$<i>$ =0 | if and only if all Cj$<i>$'s sent are 0 or, alternatively, if and only if all Bj$<i>$'s sent are 1's; |
| =1 | if and only if there is at least a "1" among the Cj$<i>$'s sent or, alternatively, if and only if there is at least one "0" among the Bj$<i>$'s sent. |

If a value is assigned to each possible combination of B$<i>$ and C$<i>$, and a symbol YY$<i>$ is used to represent all such values, then all possible combinations of B$<i>$ and C$<i>$ and the situations under which such combinations occur can be summarized in the following table:

TABLE 2

| B$<i>$ | C$<i>$ | YY$<i>$ | Remarks |
|---|---|---|---|
| 0 | 0 | [E] | Empty, no processor is sending data |
| 0 | 1 | [0] | All processors have sent 0's |
| 1 | 0 | [1] | All processors have sent 1's |
| 1 | 1 | [X] | Unresolved, mixed data is sent on that bit position |

Assume now that processors U-0, U-1, U-2, U-12, U-13, and U-14 (binary addresses 0000, 0001, 0010, 1100, 1101, and 1110) need access to resource 102. The request module 103 of each of these processors then puts its address and the binary complement thereof onto common bus 100. Accordingly, the first address B received by arbitration module 104 (which is the ORed result of 0000, 0001, 0010, 1100, 1101, and 1110) is 1111. Correspondingly, the second address C received by arbitration module 104 (which is the ORed result of the complemented addresses 1111, 1110, 1101, 0011, 0010, and 0001) is 1111. When the addresses B equal to 1111 and C equal to 1111 are combined in accordance with the rules given in Table 2, the resulting YY identifier received by arbitration module 104 is [XXXX].

Many algorithms can be used to eliminate a subset of the requesting processors. For example, each "X" in the YY identifier can successively be replaced with a "0" or a "1" by a randomization process. It is assumed, however, that arbitration in this system proceeds by setting the leftmost unresolved YY bit of "0". Accordingly, arbitration module 104 sends a YY identifier of [0XXX] to the processors. This is done by sending a P component of 0111 and Q component of 1111 to the processors.

Among the original requesting processors U-0, U-1, U-2, U-12, U-13, and U-14, the YY identifier of [0XXX] addresses U-0, U-1, and U-2 (binary addresses 0000, 0001, and 0010). As a second iteration, U-0, U-1, and U-2 send their addresses and binary complements thereof to arbitration module 104 simultaneously, resulting in a YY identifier of [00XX] received by arbitration module 104. Arbitration module 104 again replaces the leftmost unresolved YY digit with a "0", sending a YY identifier of [000X]. This is accomplished by sending a P component of 0011 and a Q component of 1111 to bus 100.

Among the remaining requesting processors U-0, U-1, and U-2, only U-0 and U-1 (binary addresses 0000 and 0001) are addressed. Their request modules therefore send their addresses and the binary complements thereof in the same manner, resulting in a YY identifier of [000X].

Arbitration module 104 finally replaces the last unresolved digit of the address with a "0", resulting in a YY identifier of [0000]. Since this YY identifier matches the YY identifier of processor U-0, it therefore has access to the resource.

Implementation of Arbitration Module 104

Let $PP<i>$ denote the ith digit of a YY identifier output of arbitration module 104 and $YY<i>$ denote the ith digit of a YY identifer input into arbitration module 104. Then, for the elimination algorithm used in this embodiment, an output bit $PP<i>$ of the arbitration module 104 is governed by the following logic equations:

| | | |
|---|---|---|
| $PP<3>$ | = 0 if | $-START*((YY<3>=0 + YY<3> = X))$ |
| $PP<i>$ | = 0 if | $-START*((YY<i>=0) + (YY<i>=X)*(YY<3>\neq X)$ $*\ldots*(YY<i+1>\neq X))$ for $i\neq 3$ |
| $PP<i>$ | = 1 if | $-START*(YY<i>=1)$ |
| $PP<i>$ | = X otherwise. | |

The START signal is included in the above equations so that all PP bits are set to [X] when the START signal is active.

If $P<i>$ and $Q<i>$ code digit $PP<i>$ according to Table 1, $B<i>$ is used to represent the combined result of all ith true address input bits, and $C<i>$ is used to represent the combined result of all ith complemented address input bits, the above equations can further be reduced to those shown in Table 3.

For each $i=0, \ldots, 3$ signal $P<i>$, which is generated by the arbitration module, and signal $B<i>$, wwhich is the wired OR of the signals $Bj<i>$ generated by the request modules, share the same line of common bus 100. This accounts for four lines of common bus 100. Similarly, for each $i=1, \ldots, 3$ signals $Q<i>$ and $C<i>$ share the same line of common bus 100. This accounts for the other four lines of common bus 100. The use of the common bus is time multiplexed between the arbitration module and the request modules by means of signals A and R, which are generated by the timing generator 111.

TABLE 3

| Outputs | Inputs and Logics | Meanings of Input Logics |
|---|---|---|
| $Q<3>$ | $= (-START * -B<3> * C<3>)$ | $YY<3> = [0]$ |
| | $+ (-START * -B<3> * -C<3>)$ | $YY<3> = [X]^2$ |
| $P<3>$ | $= (-START * B<3> * -C<3>)$ | $YY<3> = [1]$ |
| $Q<2>$ | $= (-START * -B<2> * C<2>)$ | $YY<2> = [0]$ |
| | $+ (-START * -B<2> * -C<2>)$ | $YY<2> = [X]$ |
| | $* YY3NEX^1$ | $YY<3> \neq [X]$ |
| $P<2>$ | $= (-START * B<2> * -C<2>)$ | $YY<2> = [1]$ |
| $Q<1>$ | $= (-START * -B<1> * C<1>)$ | $YY<1> = [0]$ |
| | $+ (-START * -B<1> * -C<1>)$ | $YY<1> = [X]$ |
| | $* YY3NEX^1$ | $YY<3> \neq [X]$ |
| | $* YY2NEX$ | $YY<2> \neq [X]$ |
| $P<1>$ | $= (-START * B<1> * -C<1>)$ | $YY<1> = [1]$ |
| $Q<0>$ | $= (-START * -B<0> * C<0>)$ | $YY<0> = [0]$ |
| | $+ (-START * -B<0> * -C<0>)$ | $YY<1> = [0]$ |
| | $* YY3NEX^1$ | $YY<3> \neq [X]$ |
| | $* YY2NEX$ | $YY<2> \neq [X]$ |
| | $* YY1NEX$ | $YY<1> \neq [X]$ |
| $P<0>$ | $= (-START * B<0> * -C<0>)$ | $YY<0> = [1]$ |

Figure 2:
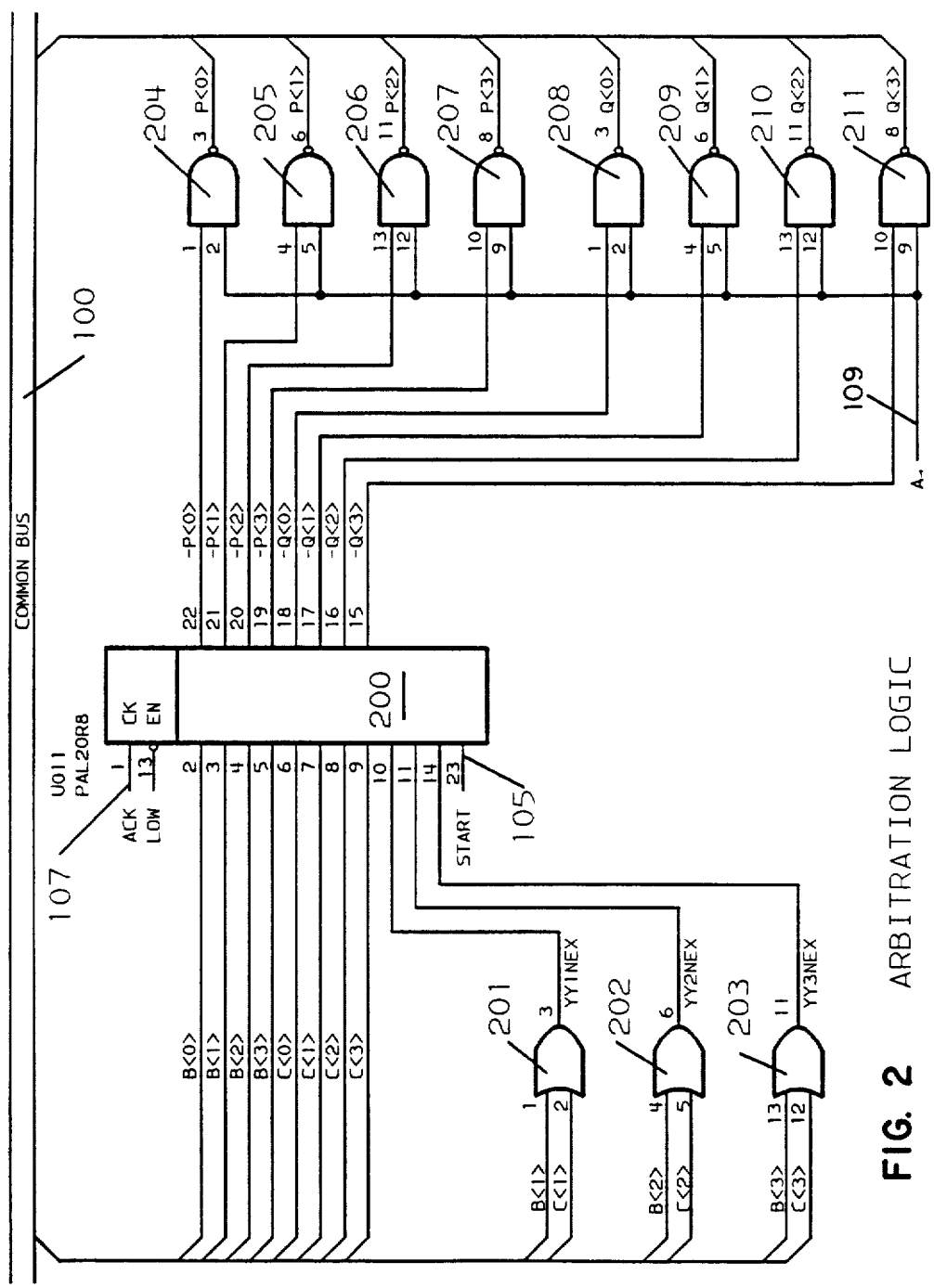
FIG. 2 is a block diagram of the arbitration module used by the central processor in resolving contention among processors requesting access to a shared resource.

[1] signals YY1NEX, YY2NEX, and YY3NEX are defined below
[2] see explanation below for coding of YY digits in this implementation As illustrated in FIG. 2, the arbitration module 104 is implemented with a programmable array logic 200, such as Part No. PAL20R8 marketed by Monolithic Memories. The equations in Table 3 are used to program the programmable array logic 200. Also as illustrated in FIG. 2, the inputs to the programmable array logic 200 comprise data from common bus 100 which, for the purpose of arbitration, consist of address bits $B<0>$ through $B<3>$ and address bits $C<0>$ through $C<3>$. As is common practice, the ORing of signals $Bj<i>$ and $Cj<i>$ is implemented as a wired OR (i.e. in negative logic). Consequently, in this implementation:

YY$<i>$ = [0]   if voltage of B$<i>$ is LOW and voltage of C$<i>$ is HIGH,
YY$<i>$ = [1]   if voltage of B$<i>$ is HIGH and voltage of C$<i>$ is LOW, and
YY$<i>$ = [X]   if voltage of B$<i>$ is LOW and voltage of C$<i>$ is LOW.

Thus, YY$<i> \neq$ X if voltage of B$<i>$ is HIGH or voltage of C$<i>$ is HIGH. Consequently, signal YY1-NEX is generated by ORing inputs B$<1>$ and C$<1>$ with an OR gate 201. Similarly, input signal YY2NEX is generated by ORing inputs B$<2>$ and C$<2>$ with an OR gate 202. Finally, input signal YY3NEX is generated by ORing B$<3>$ and C$<3>$ with an OR gate 203. The programmable array logic 200 is clocked by signal 107 generated by module 111.

Inside the programmable array logic 200, the inputs are logically combined according to the equations given in Table 3 to produce outputs $-P<0>$, $-P<1>$, $-P<2>$, $-P<3>$, $-Q<0>$, $-Q<1>$, $-Q<2>$, and $-Q<3>$. Each of these signals is fed into one side of a respective NAND gate 204 to 211 which has an open collector output. Each output from NAND gates 204 through 211 drives a corresponding bit of common bus 100.

Implementation of Request Module 103

Figure 3:
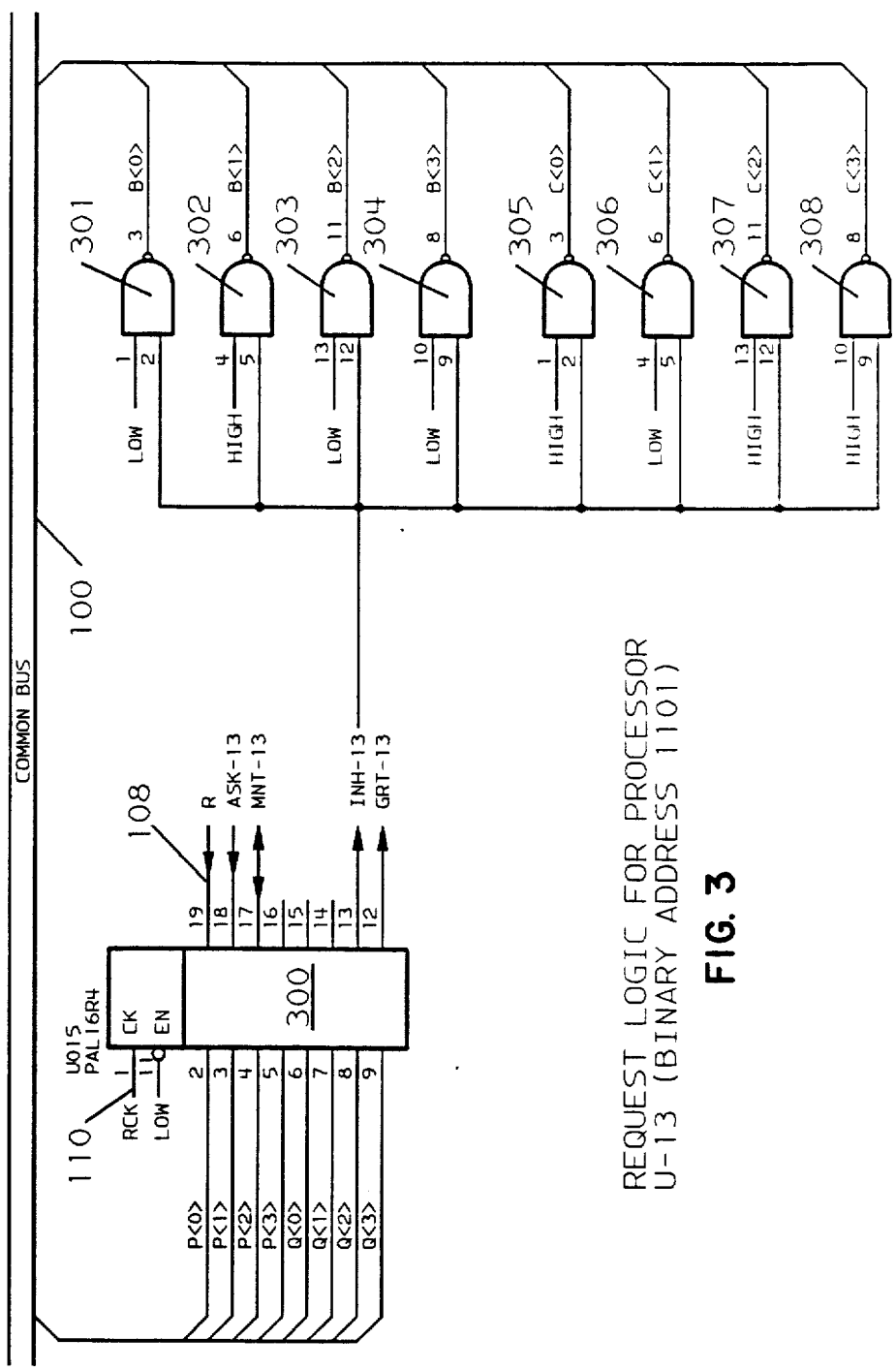
FIG. 3 is a block diagram of the request module wherein requests for access to a shared resource are made by a processor.

By way of example, a request module 103-13 for processor U-13 (binary address 1101) may be as illustrated in FIG. 3. It comprises a programmable array logic 300, such as Part No. PAL16R4 marketed by Monolithic Memories. The identity of the processor is set in each request module by connecting one side of each respective NAND date 301 through 308 as shown. Each open collector output of NAND gates 301 through 308 drives a corresponding bit of common bus 100 and computes a wired OR of all the equally significant output bits from other processors. The identity bits of gates 301 through 308 are enabled onto common bus 100, unless signal INH-13 is active (active low).

As described above, if the ASK-13 signal is activated by processor U-13, request module 103 would enable its address onto bus 100 during a designated response time, unless there is a mismatch between the YY identifier of the processor and the YY identifier sent by arbitration module 104. If MMT-13 represents the mismatch condition for processor U-13, and if R represents the designated response time, INH-13 signal must then follow the logic equation of:

TABLE 4

| Outputs | Inputs and Logics | Meanings of Logics |
|---|---|---|
| $-$INH$-$13 | = $-$R | If not designated time for request; or |
|  | + $-$ASK$-$13 | If processor U$-$13 does not need access; or |
|  | + MMT$-$13 | If an arbitration module is selecting other processors - there is a mismatch. |

The mismatch condition MMT-13 for processor U-13 can be implemented in the programmable array logic 300 using the following logic equation:

TABLE 5

| Outputs | Inputs and Logics | Meanings of Logics |
|---|---|---|
| MMT$-$13 | = ($-$P$<3>$ * Q$<3>$) | If PP$<3>$ = 0; or |
|  | + ($-$P$<2>$ * Q$<2>$) | If PP$<2>$ = 0; or |
|  | + ( P$<1>$ * $-$Q$<1>$) | If PP$<1>$ = 1; or |

TABLE 5-continued

| Outputs | Inputs and Logics | Meanings of Logics |
|---|---|---|
|  | +($-$P$<0>$ * Q$<0>$) | If PP$<0>$ = 0 |

When the YY identifier sent by the arbitration module exactly matches the YY identifier of request module of processor U-13, a GRT-13 signal is sent to processor U-13 to indicate that it has access to the common resource 102. The GRT-13 signal of processor U-13 is implemented in the programmable array logic 300 using the following logic equation:

TABLE 6

| Outputs | Inputs and Logics | Meanings of Logics |
|---|---|---|
| GRT$-$13 | = ( C$<3>$ * $-$B$<3>$) | If PP$<3>$ = 1; and |
|  | * ( C$<2>$ * $-$B$<2>$) | If PP$<2>$ = 1; and |
|  | * ($-$C$<1>$ * B$<1>$) | If PP$<1>$ = 0; and |
|  | * ( C$<0>$ * $-$B$<0>$) | If PP$<0>$ = 1 |

Implementation of System Timing Generator 111

Figure 4:
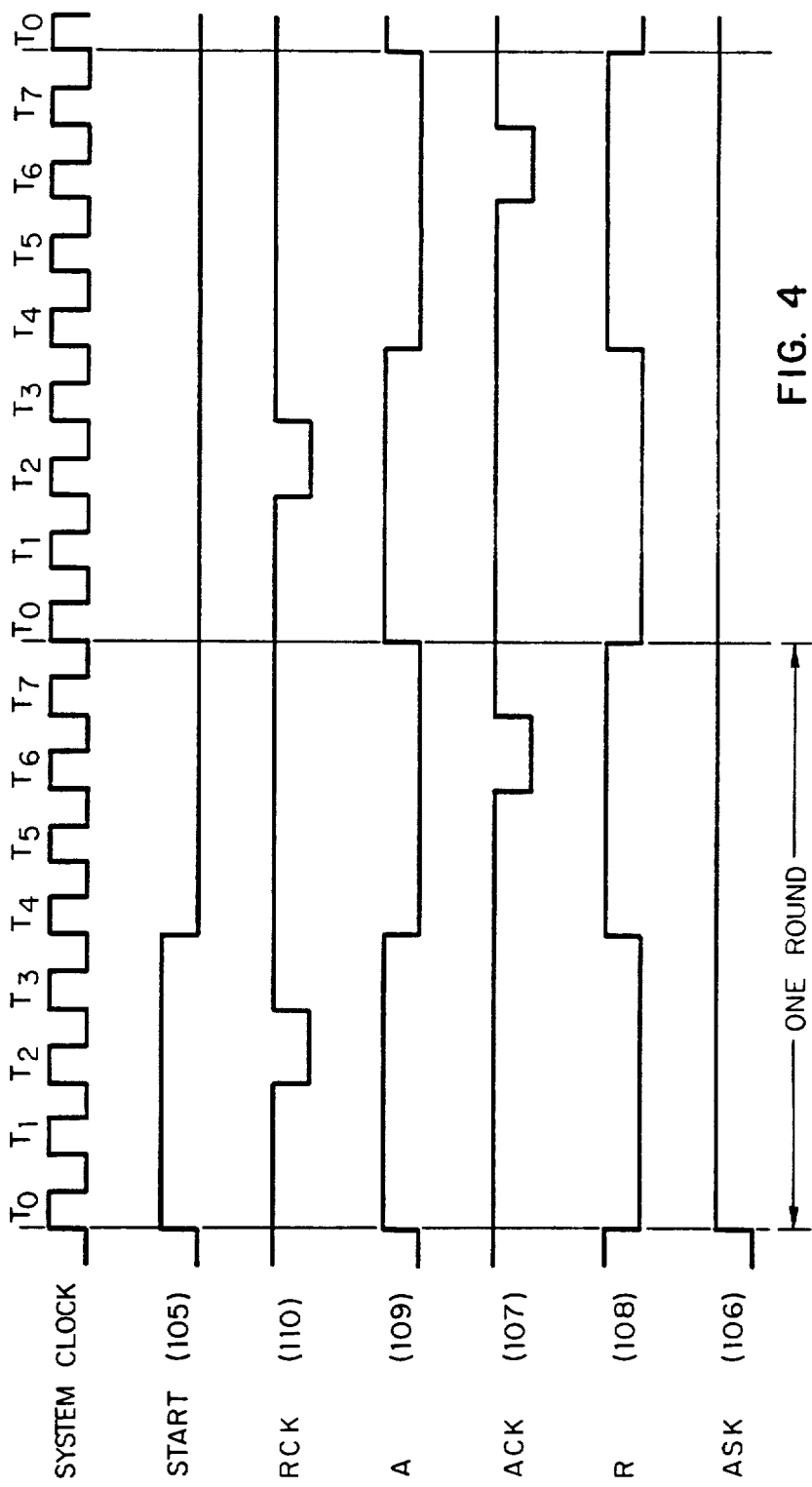
FIG. 4 is a timing diagram showing the operational relationship of the several clock signals used in the arbitration process.

Arbitration module 104 and request modules 103-0 through 103-15 are clocked by timing signals generated by system timing generator 111. A timing diagram of the clock signals is shown in FIG. 4.

Figure 5:
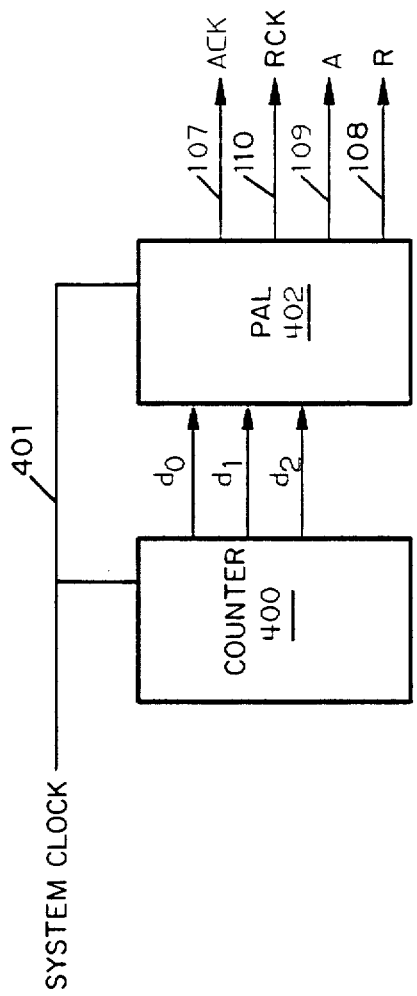
FIG. 5 is a block diagram of the module which generates the timing signals used in the arbitration process.

As illustrated in FIG. 5, system timing generator 111 comprises a counter 400, which counts the system clock signal 401 to give a 4-bit output d0 to d2. These outputs are then used by a programmable array logic 402 to generate signals 107 to 110 in accordance with the following equations:

TABLE 7

| Outputs | Inputs and Logics | Meaning |
|---|---|---|
| $-$ACK | := d2 * d1 * $-$d0 | T6 |
| $-$RCK | := $-$d2 * d1 * $-$d0 | T2 |
| A | := $-$d2 | T0, T1, T2, T3 |
| R | := d2 | T4, T5, T6, T7 |

States Determination

If central processor 101 wants to know the specific states (e.g. whether a processor has a program check) of a subset of processors (say, processors 0010, 0100, and 0110), it can address the subset with a YY identifier of [0XX0] by putting a true address P of 0110 and a complement address of 1111 onto common bus 100.

Upon receipt of the central processor's request, an addressed processor with a program check responds by sending its true and complemented addresses to the central processor 101. For example, if processors with addresses 0010, 0100, and 0110 have a program check, then these processors would send their true addresses (0010, 0100, and 0110) and their complemented addresses (1101, 1011, and 1001) to central processor 101. One address received by the central processor 101 (i.e. the ORed result of all the true address bits) is thus 0110. The second address received by the central processor 101 (i.e. the ORed result of all the complement address bits) is 1111. From Table 2, the resultant YY bits are thus YY=[0XX0]. Generally, one of the following results can be received by the central processor 101:

(a) If YY=[all E], then no processor has a program check;
(b) If YY=[0's and 1's], then only one processor has a program check; or
(c) If YY=[0's, 1's, and X's], and if the number of X's is k, then at least 2 and at the most 2**k processors have a program check.

Using the received YY identifier and by iteratively narrowing the subset of processors, the central processor 101 can identify a processor within k−1 iterations. For example, central processor 101 can, as a next step, put YY=[0X00] on bus 100. Now, because only processors 0100 and 0110 are addressed, they respond by sending their true (0100 and 0110) and complement (1011 and 1001) addresses. Central processor 101 then receives a first address of 0110 (the ORed result of 0100 and 0110) and a second address of 1011 (the ORed result of 1011 and 1001), which is a YY identifier of [01X0]. Since there is only one "X" in the YY address, the identities of the two processors (0100 and 0110) which have a program check are readily known. Similarly, by sending the true and complement addresses in which the YY identifier is [00X0], central processor 101 would receive a response of YY=[0010], indicating that processor 0010 has a program check.

While the invention has been shown and described with reference to a preferred embodiment thereof, it will be understood by those skilled in the art that changes in form and detail may be made therein without departing from the spirit, scope, and teaching of the invention. Accordingly, the method herein disclosed is to be considered merely as illustrative and the invention is to be limited only as specified in the claims.

We claim:

1. A method for communicating data between a plurality of individually identifiable processors in a data processing system, comprising the steps, at the processor initiating the communication, of:
   (a) forming a first word by logically combining the identifiers of a subset of processors with which communication is to be established; and
   (b) forming a second word which, when combined with said first word in a predetermined manner, designates the subset of processors with which communication is to be established, wherein said second word is formed by, at each bit position:
      (i) generating a bit which has a first state which is the same as a bit of like significance in said first word which, in combination with the bit of like significance in said first word, indicates no bit information in the bit position;
      (ii) generating a bit which has a state opposite that of a bit of like significance in said first word which, in combination with the bit of like significance in the first word, indicates the same bit information as the bit of like significance in said first word; and
      (iii) generating a bit which has a second state which is the same as a bit of like significance in said first word which, in combination with the bit of like significance in the first word, indicates either said first state or said second state in said bit position;
      (iv) transmitting said first and second words to a central arbitration processor.

2. A method for communicating data between a plurality of individually identifiable processors in a data processing system, comprising the steps, at the processor initiating the communication, of:
   (a) forming a first word by logically combining the identifiers of a subset of processors with which communication is to be established;
   (b) forming a second word which, when combined with said first word in a predetermined manner, designates the subset of processors with which communication is to be established; and
   (c) combining said first word and said second word to generate a third word by, at each bit position:
      (i) using the state of the bit with like bit significance in said first word if there is a mismatch between the bit of like significance in said first word and the bit of like significance in said second word; and
      (ii) using a "don't care" state if there is a match between the bit of like significance in said first word and the bit of like significance in said second word;
   (d) transmitting said third word to said processors to which communication is to be established.

3. A method for selecting one of $N \leq 2^m$ processors concurrently requesting access to a shared resource through a central processor, each processor being designated by a unique identifier, comprising the steps of:
   (a) forming a first m-bit word and a second m-bit word by logically combining said N identifiers and logically combining N binary complements of the said N identifiers;
   (b) designating a subset of the requesting processors through formation of an m-bit subset identifier by substituting in each bit position thereof a value selected from the set consisting of a first value, a second value, and an ambiguous term, said substitution being governed according to the match and mismatch condition among pairs of bits of the first and second words of like bit significance, the maximum subset size being a function of the position and occurrence of the ambiguous term in the subset identifier; and
   (c) eliminating all but one of the designated subsets of requesting processors and then granting access to the remaining processor, according to a dynamically changeable algorithm.

4. A method for centrally arbitrating access to a shared resource among a set of uniquely identified requesting units, comprising, at each requesting unit, transmitting an m-bit identity code and its binary complement to a central arbitration processor, and, comprising, at the central arbitration processor, the steps of:
   (a) in the event of only one request, granting access to the requesting unit immediately; and
   (b) in the event of $N \leq 2^m$ concurrent requests;
      (1) logically combining the N identity codes to form a first m-bit word;
      (2) logically combining the N binary complements of the N identity codes to form a second m-bit word;
      (3) designating a subset of requesting units through formation of a third m-digit position word by translating the combined binary states of each $i^{th}$ bit of said first m-bit word and the corresponding $i^{th}$ bit of said second m-bit word into a value in a predetermined manner, and assigning said value to each corresponding $i^{th}$ bit position of said third m-digit position word; and
      (4) eliminating all but one of the units from said designated subset of requesting units according to a dynamically changeable algorithm, and then repeating steps (1), (2), and (3) above.

5. A method according to claim 4, wherein during the steps of designating a subset of requesting processors, the comparison match and the comparison mismatch conditions are of first and second kinds;

the comparison match condition of the first kind indicating a pair of matching binary ones and of the second kind indicating a pair of matching binary zeroes, the match occurring in digit positions of like significance in the first and second words; and the comparison mismatch condition of the first kind indicating a binary one in a digit position of the first word and a binary zero in a digit position of like significance in the second word, the values of the digit positions during a mismatch condition of the second kind being reversed.

6. A method according to claim 4, wherein said translation is depending upon whether a first bit matches a second bit in one binary state, said first bit matches said second bit in the other binary state, said first bit mismatches said second bit in one direction, or said first bit mismatches said second bit in the other direction.

7. In a system for arbitrating access to a shared resource among a plurality of uniquely identifiable units, wherein said arbitration is centrally controlled by a central arbitration processor connected to said shared resource and to said plurality of units, a method by which the central arbitration processor addresses a selected subset of said units, comprising the steps of:
  (a) generating an m-bit address by logically combining, at each bit position, corresponding bits of the identity codes of the units of said subset of units;
  (b) generating an m-bit logical complement of said first address based upon a predefined set of protocols; and
  (c) generating an m-bit group identifier of said selected subset of units, by translating the combined binary states of each $i^{th}$ bit of said address and the corresponding $i^{th}$ bit of said complement into a value in a predetermined manner, and assigning said value to the $i^{th}$ bit position of said group identifier, wherein said translation is dependent on whether a first bit matches a second bit in one binary state, said first bit matches said second bit in the other binary state, said first bit mismatches said second bit in one direction, or said first bit mismatches said second bit in the other direction;
  (d) excluding from access to said shared resource units whose identity code does not match said m-bit group identifier.

8. In a system for arbitrating concurrent requests for access to a shared resource among a plurality of uniquely identifiable units, wherein said arbitration is centrally controlled by a central arbitration processor which is connected to the requesting units, an apparatus for unbiasedly communicating access requests to the central arbitration processor, comprising:
  (a) a sender in each requesting unit for sending an m-bit identity code and the m-bit binary complement thereof;
  (b) a first receiver in said central arbitration processor for receiving the identity codes from the requesting units and logically combining, at each bit position, corresponding bits of said identity codes received into a first m-bit word;
  (c) a second receiver in said central arbitration processor for receiving the binary complements of said identity codes from the requesting units and logically combining, at each bit position, corresponding bits of said binary complements received into a second m-bit word; and
  (d) means coupled to said first and second receivers for translating the combined states of each $i^{th}$ bit of said first m-bit word and the corresponding $i^{th}$ bit of said second m-bit word into a value in a predetermined manner, and generating an m-bit group identifier of the requesting units based upon said translation.

9. An apparatus as in claim 8, wherein said translation means generates said value depending upon whether a first bit matches a second bit in one binary state, said first bit matches said second bit in the other binary state, said first bit mismatches said second bit in one direction, or said first bit mismatches said second bit in the other direction.

10. A method of arbitrating simultaneous requests for access to a shared resource by a plurality of units, wherein each of said units is identified by a unique address identifier, said address identifiers each comprising a plurality of address bits, each of said address bits occupying a bit position, the method comprising:
  (a) a central arbitration module transmits an address identifier code to each of a plurality of units, wherein said address identifier code transmitted by said central arbitration module includes a plurality of address code bits, each occupying a bit position, some of which address code bits may represent a bit of any value;
  (b) each of said units requesting access to said shared resource and whose address identifier matches said transmitted address identifier code transmits to said central arbitration module its unique address identifier;
  (c) said central arbitration module examines the bits of all said transmitted address identifiers from said units to determine if any of said address identifier bits differ at corresponding bit positions;
  (d) if at a first bit position differing address identifier bits are detected, said central arbitration module establishes a new first address identifier bit for that bit position;
  (e) said central arbitration module transmits a new address identifier code incorporating said first established value at said first bit position, causing at least one of said requesting units that was previously addressed to not be addressed;
  (f) successively repeating steps (b) through (e) for those requesting units that are addressed in steo (e), successively excluding requesting units until said central arbitration module, in step (c), determines that at no bit positions of said address identifiers are there any differing address identifier bits, indicating that only one requesting unit remains.

11. The method of claim 10, additionally comprising:
  in step (b) each of said plurality of units that are requesting access to said shared resource and whose address identifier matches said transmitted address identifier code additionally transmits to said central arbitration module a complement address identifier comprising the binary complements of the address bits of said unique address identifier; and
  in step (c) said central arbitration module examines the bits of all said transmitted complement address identifiers in addition to said transmitted address identifiers in establishing said first address identifier bit and generating said new address identifier code.

12. The method of claim 11, wherein said address identifier code transmitted by said central arbitration module comprises first and second component words, each comprising a plurality of binary bits, wherein:

if the ith bit of said first component word has a first
bit value and the ith bit of said second component
word has a second bit value, unit address identifiers
in which the ith bit has said first bit value match the
ith bit of said address identifier code;

if the ith bit of said first component word has said
second bit value and the ith bit of said second component
word has said first bit value, unit address
identifiers in which the ith bit has said second bit
value match the ith bit of said address identifier
code; and if the ith bit of said first component word has said
second bit value and the ith bit of said second component
word has said second bit value, unit address
identifiers in which the ith bit has either said first or
second bit value match the ith bit of said address
identifier code.

13. The method of claim 12, wherein said central arbitration module logically ORs all the bits in corresponding positions in said transmitted address identifiers and logically ORs all the bits in corresponding positions in said transmitted complement address identifiers to detect whether any of said address identifier bits differ at corresponding bit positions.

14. Apparatus for arbitrating simultaneous requests for access to a shared resource by a plurality of units, wherein each of said units is identified by a unique address identifier, said address identifier comprising a plurality of address bits, each of said address bits occupying a bit position, the apparatus comprising:
   (a) a central arbitration module including a transmitter for transmitting an address identifier code to each of a plurality of units, wherein said address identifier code transmitted by said central arbitration module includes a plurality of address code bits, each occupying a bit position, some of which address code bits may represent a bit of any value;
   (b) an address identifier transmitter in each of said plurality of units that are requesting access to said shared resource and whose address identifier matches said transmitted address identifier code for transmitting to said central arbitration module its unique address identifier;
   (c) a receiver in said central arbitration module for receiving said transmitted address identifiers and examining the bits of all said transmitted address identifiers to determine if any of said address identifier bits differ at corresponding bit positions;
   (d) modifying means in said central arbitration module for establishing a new first address identifier bit for a first bit position of said first bit position differing address identifier bits are detected; and
   (e) wherein said transmitter of said central arbitration module transmits a new address identifier code incorporating said new first address identifier bit at said first bit position, to cause at least one of said requesting units that was previously addressed to not be addressed.

15. A method of arbitrating simultaneous requests for access to a shared resource by a plurality of units, wherein each of said units is identified by a unique address identifier, the method comprising:
   (a) a central arbitration module transmits an address code that addresses a set of units connected to a shared resource;
   (b) each unit in said addressed set that requests access to said shared resource transmits to said central arbitration module its address identifier;
   (c) said central arbitration module examines said address identifiers received from said units requesting access to said shared resource and determines if more than one unit in said addressed set is requesting access;
   (d) if said central arbitration module determines that more than one unit in said addressed set is requesting access, said central arbitration module modifies said address code to create a modified address code that addresses a subset of said addressed set of units and transmits said modified address code;
   (e) repeating steps (b) through (d) with the units of said subset that are requesting access to said shared resource and successive subsets of units each iteration that said central arbitration module determines in step (c) that more than one unit in said addressed subset is requesting access;
   (f) when said central arbitration module determines that only one unit of the addressed set or subset is requesting access to said shared resource, said central arbitration module grants access to said shared resource to said one unit requesting access.

* * * * *